United States Patent [19]
Candelaria et al.

[11] Patent Number: 5,682,513
[45] Date of Patent: Oct. 28, 1997

[54] CACHE QUEUE ENTRY LINKING FOR DASD RECORD UPDATES

[75] Inventors: Susan Kay Candelaria; Vernon John Legvold; Warren Keith Stanley, all of Tucson, Ariz.

[73] Assignee: International Business Machines Corporation, Armonk, N.Y.

[21] Appl. No.: 414,826

[22] Filed: Mar. 31, 1995

[51] Int. Cl.⁶ .............................. G06F 12/02; G06F 12/16
[52] U.S. Cl. ................................. 395/440; 395/489
[58] Field of Search ........................ 395/440, 489

[56] References Cited

U.S. PATENT DOCUMENTS

| | | | |
|---|---|---|---|
| 4,392,200 | 7/1983 | Arulpragasam et al. | 315/467 |
| 5,263,154 | 11/1993 | Eastridge et al. | 395/182.04 |
| 5,303,362 | 4/1994 | Butts et al. | 395/448 |
| 5,418,929 | 5/1995 | Tsuboi et al. | 395/440 |
| 5,504,861 | 4/1996 | Crockett et al. | 395/182.11 |

OTHER PUBLICATIONS

Schneider, G. Michael, and Steven C. Bruell. "Concepts in Data Structures and Software Development". New York: West Publishing Company, 1991.

IBM TDB, V. 37, N. 02A, Feb., 1994, p. 481, "Method for Improving the Host I/O Performance During Concurrent Copy".

Primary Examiner—Glenn Gossage
Assistant Examiner—Reginald G. Bragdon
Attorney, Agent, or Firm—F. E. Anderson; R. M. Sullivan

[57] ABSTRACT

A data storage system provides disaster recovery capability by asynchronously transmitting record updates to a secondary site in sequence consistent order. Such record updates are stored at a primary site in a cache memory of a storage controller. A circular queue is created having a head pointer for locating a first (or oldest) record update with subsequent record updates of a track being linked therefrom in sequence consistent order. A tail pointer of the circular queue points to the last record update. A counter field is provided in a track slot header for counting a number of updated records in the track and hence the circular queue. When a data mover in the host processor at the primary site reads record updates for transmission to the secondary site, the data mover starts with the record update pointed to by the head pointer such that the data mover moves through the circular queue (and hence the record updates) in a backward chain fashion. The counter is decremented as each record update in the track is read by the data mover such that when the counter reaches zero the data mover knows that no other record updates exist for that track.

11 Claims, 10 Drawing Sheets

CACHE QUEUE ENTRY LINKING FOR DASD RECORD UPDATES

FIELD OF THE INVENTION

The present invention relates generally to data storage techniques, and more particularly, to a system for improving backup copy performance of direct access storage device (DASD) data.

BACKGROUND OF THE INVENTION

Data processing systems, in conjunction with processing data, typically are required to store large amounts of data (or records), which data can be efficiently accessed, modified, and re-stored. Data storage is typically separated into several different levels, or hierarchically, in order to provide efficient and cost effective data storage. A first, or highest level of data storage involves electronic memory, usually dynamic or static random access memory (DRAM or SRAM). Electronic memories take the form of semiconductor integrated circuits wherein millions of bytes of data can be stored on each circuit, with access to such bytes of data measured in nano-seconds. The electronic memory provides the fastest access to data since access is entirely electronic.

A second level of data storage usually involves direct access storage devices (DASD). DASD storage, for example, can comprise magnetic and/or optical disks, which store bits of data as micrometer sized magnetic or optical altered spots on a disk surface for representing the "ones" and "zeros" that make up those bits of the data. Magnetic DASD, includes one or more disks that are coated with remnant magnetic material. The disks are rotatably mounted within a protected environment. Each disk is divided into many concentric tracks, or closely spaced circles. The data is stored serially, bit by bit, along each track. An access mechanism, known as a head disk assembly (HDA), typically includes one or more read/write heads, and is provided in each DASD for moving across the tracks to transfer the data to and from the surface of the disks as the disks are rotated past the read/write heads. DASDs can store giga-bytes of data with the access to such data typically measured in milli-seconds (orders of magnitudes slower than electronic memory). Access to data stored on DASD is slower due to the need to physically position the disk and HDA to the desired data storage location.

A third or lower level of data storage includes tape and/or tape and DASD libraries. Access to data is much slower in a library since a robot is necessary to select and load the needed data storage medium. The advantage is reduced cost for very large data storage capabilities, for example, tera-bytes of data storage. Tape storage is often used for backup purposes, that is, data stored at the second level of the hierarchy is reproduced for safe keeping on magnetic tape. Access to data stored on tape and/or in a library is presently on the order seconds.

Having a back-up data copy is mandatory for many businesses as data loss could be catastrophic to the business. The time required to recover data lost at the primary storage level is also an important recovery consideration. An improvement in speed over tape or library back-up, includes dual copy. An example of dual copy involves providing additional DASD's so that data is written to the additional DASDs (sometimes referred to as mirroring). Then if the primary DASDs fail, the secondary DASDs can be depended upon for data. A drawback to this approach is that the number of required DASDs is doubled.

Another data back-up alternative that overcomes the need to provide double the storage devices involves writing data to a redundant array of inexpensive devices (RAID) configuration. In this instance, the data is written such that the data is apportioned amongst many DASDs. If a single DASD fails, then the lost data can be recovered by using the remaining data and error correction procedures. Currently there are several different RAID configurations available.

The aforementioned back-up solutions are generally sufficient to recover data in the event that a storage device or medium fails. These back-up methods are useful only for device failures since the secondary data is a mirror of the primary data, that is, the secondary data has the same volume serial numbers (VOLSERs) and DASD addresses as the primary data. System failure recovery, on the other hand, is not available using mirrored secondary data. Hence still further protection is required for recovering data if a disaster occurs destroying the entire system or even the site, for example, earthquakes, fires, explosions, hurricanes, etc. Disaster recovery requires that the secondary copy of data be stored at a location remote from the primary data. A known method of providing disaster protection is to back-up data to tape, on a daily or weekly basis, etc. The tape is then picked up by a vehicle and taken to a secure storage area usually some kilo-meters away from the primary data location. A problem is presented in this back-up plan in that it could take days to retrieve the back-up data, and meanwhile several hours or even days of data could be lost, or worse, the storage location could be destroyed by the same disaster. A somewhat improved back-up method would be to transmit data to a back-up location each night. This allows the data to be stored at a more remote location. Again, some data may be lost between back-ups since back-up does not occur continuously, as in the dual copy solution. Hence, a substantial data amount could be lost which may be unacceptable to some users.

More recently introduced data disaster recovery solutions include remote dual copy wherein data is backed-up not only remotely, but also continuously. In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Remote copy solutions generally back up data at the secondary site in an order consistent with the data writes at the primary site. When a record is updated, and the prior version of that record is not yet copied to the secondary site, a copy of the unmodified record must be preserved for the data mover, typically by copying prior versions to a sidefile or the like. This can lead to substantial overhead processing in order to maintain sequence consistency. Still worse, the update may again be updated one or more times. Hence, multiple copies and management associated therewith is required and performance is negatively impacted.

Accordingly it is desired to provide a method and apparatus for managing records and updates thereof without re-copying those records and updates while waiting for back-up copies to be made at a secondary site.

SUMMARY OF THE INVENTION

An object of the present invention is to provide an improved design and method for shadowing DASD data to a secondary site for disaster recovery.

Another object of the present invention is to provide a circular queue in a storage controller memory for linking record updates in a backward chain.

According to a first embodiment of the present invention, a method for linking records and record updates thereof in a sequence consistent order, wherein a data storage system includes a host processor having a data mover for transmitting those records and record updates to a remote site for disaster recovery. The data storage system further includes a storage controller and a direct access storage device (DASD) coupled thereto. A cache memory is included in the storage controller wherein the storage controller creates a track slot and a track slot header for each track stored in the cache memory. In the method a circular queue is created in the cache memory, the circular queue having a head pointer and a tail pointer such that the head pointer references a first record update in a first track stored in the cache memory, and the tail pointer references a last record update in the first track. Intermediate record updates are referenced between the head and tail pointers in an order consistent with an order the intermediate updates are made. If the first record update is again updated by the application before the first update is transmitted to the remote site, a new track slot and a new track slot header are generated for the again updated first record, the new track slot header referenced by the track slot header. The data mover reads the first record update by accessing the circular queue in a backward chain starting with the head pointer such that the intermediate record updates and the last record update are read in the order which the intermediate and last record updates were made.

In another embodiment of the present invention, a storage controller in a data storage system for linking a plurality of record updates in a first track in a backward chain using a circular queue is provided. The data storage system includes a host processor coupled to the storage controller for running an application generating the plurality of record updates. Further, a direct access storage device (DASD) is coupled to the storage controller for storing the plurality of record updates. The storage controller includes a storage path for directing record updates between the DASD and the host processor. A cache memory is coupled to the storage path for storing a first track slot, the first track slot storing a first track including the plurality of record updates. Additionally, the cache memory further stores a first track slot header corresponding to the first track slot and having a Q counter for counting a number of records updated in the first track slot and having a Q anchor pointer for referencing an entry in the circular queue. The circular queue contains one entry for each record update of the plurality of record updates, each entry linked to form the backward chain.

The foregoing and other objects, features, and advantages of the invention will be apparent from the following more particular description of a preferred embodiment of the invention, as illustrated in the accompanying drawing.

DETAILED DESCRIPTION

Figure 1:
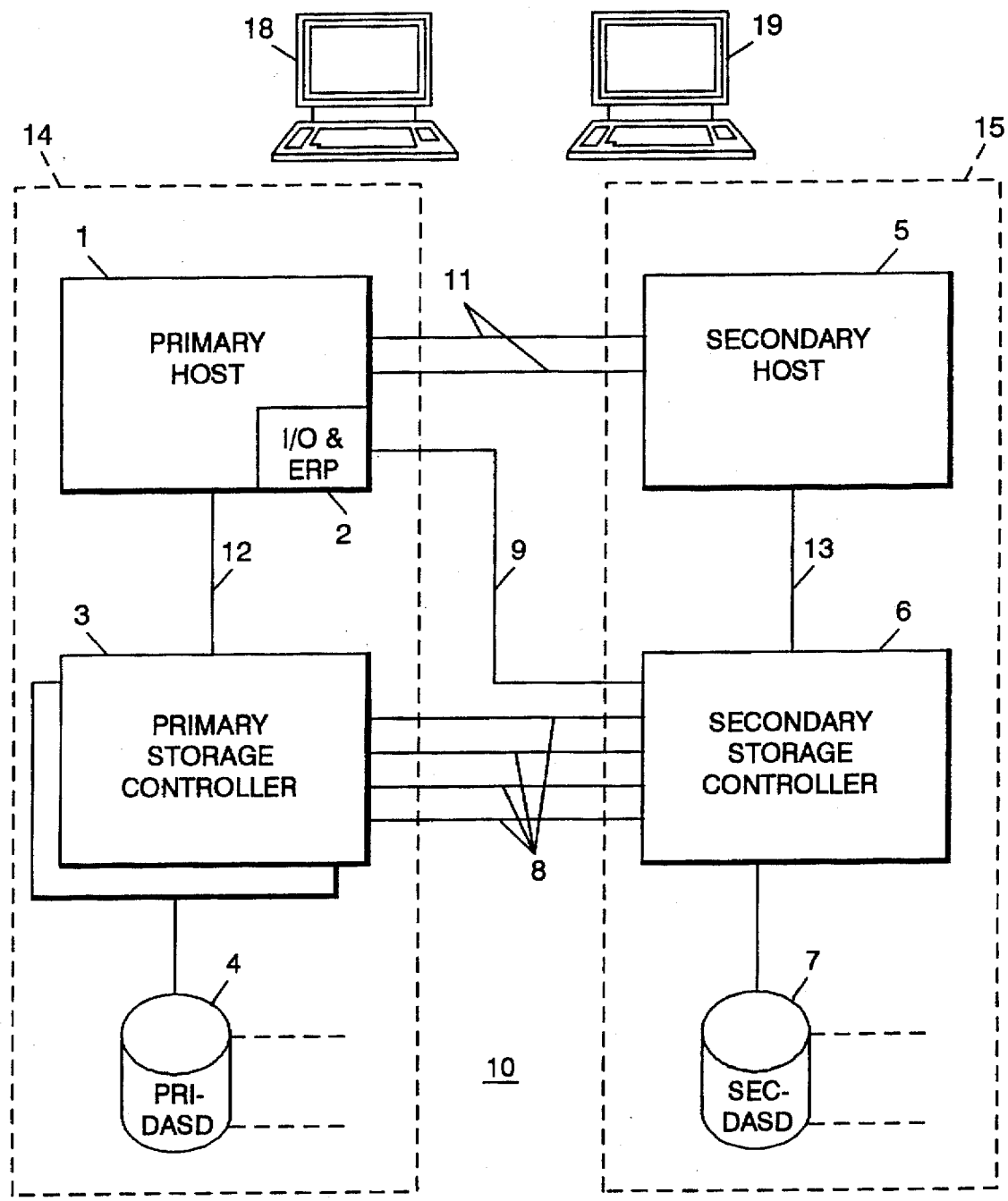
FIG. 1 is a block diagram of a disaster recovery system having synchronous remote data shadowing capabilities.

A typical data processing system may take the form of a host processor, such as an IBM System/360 or IBM System/370 processor for computing and manipulating data, and running, for example, data facility storage management subsystem/multiple virtual systems (DFSMS/MVS) software, having at least one IBM 3990 storage controller attached thereto. Typically the storage controller includes a memory controller and one or more cache memory types incorporated therein. The storage controller is further connected to a group of direct access storage devices (DASDs) such as IBM 3380 or 3390 DASDs. While the host processor provides substantial computing power, the storage controller provides the necessary functions to efficiently transfer, stage/destage, convert and generally access large databases.

Disaster recovery protection for the typical data processing system requires that primary data stored on primary DASDs be backed-up at a secondary or remote location. The distance separating the primary and secondary locations depends upon the level of risk acceptable to the user, and can vary from several kilo-meters to thousands of kilo-meters. The secondary or remote location, in addition to providing a back-up data copy, must also have enough system information to take over processing for the primary system should the primary system become disabled. This is due in part because a single storage controller does not write data to both primary and secondary DASD strings at the primary and secondary sites. Instead, the primary data is stored on a primary DASD string attached to a primary storage controller while the secondary data is stored on a secondary DASD string attached to a secondary storage controller.

The secondary site must not only be sufficiently remote from the primary site, but must also be able to back-up primary data in real time. The secondary site needs to back-up primary data as the primary data is updated with some minimal delay. Additionally, the secondary site has to back-up the primary data regardless of the application program (e.g., IMS, DB2) running at the primary site and generating the data and/or updates. A difficult task required of the secondary site is that the secondary data must be order consistent, that is, secondary data is copied in the same sequential order as the primary data (sequential consistency) which requires substantial system considerations. Sequential consistency is complicated by the existence of multiple storage controllers each controlling multiple DASDs in a data processing system. Without sequential consistency, secondary data inconsistent with primary data would result, thus corrupting disaster recovery.

Remote data duplexing falls into two general categories, synchronous and asynchronous. Synchronous remote copy involves sending primary data to the secondary location and confirming the reception of such data before ending a primary DASD input/output (I/O) operation (providing a channel end (CE) and device end (DE) to the primary host). Synchronous copy, therefore, slows the primary DASD I/O response time while waiting for secondary confirmation. Primary I/O response delay is increased proportionately with the distance between the primary and secondary systems—a factor that limits the remote distance to tens of kilo-meters. Synchronous copy, however, provides sequentially consistent data at the secondary site with relatively little system overhead.

Asynchronous remote copy provides better primary application system performance because the primary DASD I/O operation is completed (providing a channel end (CE) and device end (DE) to the primary host) before data is confirmed at the secondary site. Therefore, the primary DASD I/O response time is not dependent upon the distance to the secondary site and the secondary site could be thousands of kilo-meters remote from the primary site. A greater amount of system overhead is required, however, for ensuring data sequence consistency since data received at the secondary site will often not be in order of the primary updates. A failure at the primary site could result in some data being lost that was in transit between the primary and secondary locations.

SYNCHRONOUS DATA SHADOWING

Synchronous real time remote copy for disaster recovery requires that copied DASD volumes form a set. Forming such a set further requires that a sufficient amount of system information be provided to the secondary site for identifying those volumes (VOLSERs) comprising each set and the primary site equivalents. Importantly, the secondary site forms a "duplex pair" with the primary site and the secondary site must recognize when one or more volumes are out of sync with the set, that is, "failed duplex" has occurred. Connect failures are more visible in synchronous remote copy than in asynchronous remote copy because the primary DASD I/O is delayed while alternate paths are retried. The primary site can abort or suspend copy to allow the primary site to continue while updates for the secondary site are queued, the primary site marking such updates to show the secondary site is out of sync. Recognizing exception conditions that may cause the secondary site to fall out of sync with the primary site is needed in order that the secondary site be available at any time for disaster recovery. Error conditions and recovery actions must not make the secondary site inconsistent with the primary site.

Maintaining a connection between the secondary site and the primary site with secondary DASD present and accessible, however, does not ensure content synchronism. The secondary site may lose synchronism with the primary site for a number of reasons. The secondary site is initially out of sync when the duplex pair is being formed and reaches sync when an initial data copy is completed. The primary site may break the duplex pair if the primary site is unable to write updated data to the secondary site in which case the primary site writes updates to the primary DASD under suspended duplex pair conditions so that the updating application can continue. The primary site is thus running exposed, that is, without current disaster protection copy until the duplex pair is restored. Upon restoring the duplex pair, the secondary site is not immediately in sync. After applying now pending updates, the secondary site returns to sync. The primary site can also cause the secondary site to lose sync by issuing a suspend command for that volume to the primary DASD. The secondary site re-syncs with the primary site after the suspend command is ended, duplex pair is re-established, and pending updates are copied. On-line maintenance can also cause synchronization to be lost.

When a secondary volume is out of sync with a primary volume, the secondary volume is not useable for secondary system recovery and resumption of primary applications. An out-of-sync volume at the secondary site must be identified as such and secondary site recovery-takeover procedures need to identify the out-of-sync volumes for denying application access (forcing the volumes off-line or changing their VOLSERs). The secondary site may be called upon to recover the primary site at any instant wherein the primary site host is inaccessible—thus the secondary site requires all pertinent information about a sync state of all volumes. The secondary storage subsystem, that is the secondary storage controllers and DASD, is unable to determine all conditions causing the primary site to break synchronism due to primary site-encountered exceptions. For example, the primary site may break a duplex pair if the primary site is unable to access the secondary peer due to a primary I/O path or link failure that the secondary site is unaware of. In this case the secondary site shows in-sync state while the primary site indicates the duplex pair is broken.

External communication may notify the secondary site that an out-of-sync duplex pair volume exists. This is realizable by employing a user systems management function. Primary I/O operations end with channel end/device end/unit check (CE/DE/UC) status and sense data indicates the nature of the error. With this form of I/O configuration an error recovery program (ERP) processes the error and sends an appropriate message to the secondary processor before posting the primary application that I/O is complete. The user is then responsible to recognize the ERP suspend duplex pair message and secure that information at the secondary location. When the secondary site is depended upon to become operational in place of the primary site, a start-up procedure brings the secondary DASD on-line to the secondary host wherein sync status stored in the secondary DASD subsystem is retrieved for ensuring that out-of-sync volumes are not brought on-line for application allocation. This sync status merged with all ERP suspend duplex pair messages gives a complete picture of the secondary out-of-sync volumes.

Referring now to FIG. 1, a disaster recovery system 10 is shown having a primary site 14 and a secondary site 15, wherein the secondary site 15 is located, for example, 20 kilo-meters remote from the primary site 14. The primary site 14 includes a host processor or primary processor 1 having an application and system I/O and Error Recovery Program 2 running therein (hereinafter referred to as I/O ERP 2). The primary processor 1 could be, for example, an IBM Enterprise Systems/9000 (ES/9000) processor running DFSMS/MVS operating software and further may have several application programs running thereon. A primary storage controller 3, for example, an IBM 3990 Model 6 storage controller, is connected to the primary processor 1 via a channel 12. As is known in the art, several such primary storage controllers 3 can be connected to the primary processor 1, or alternately, several primary processors 1 can be attached to the primary storage controllers 3. A primary DASD 4, for example, an IBM 3390 DASD, is connected to the primary storage controller 3. Several primary DASDs 4 can be connected to the primary storage controller 3. The primary storage controller 3 and attached primary DASD 4 form a primary substorage system. Further, the primary storage controller 3 and the primary DASD 4 could be single integral units. The secondary site 15 includes a secondary processor 5, for example, an IBM ES/9000, connected to a secondary storage controller 6, for example an IBM 3990 Model 3, via a channel 13. A DASD 7 is further connected to the secondary storage controller 6. The primary processor 1 is connected to the secondary processor 5 by at least one host-to-host communication link 11, for example, channel links or telephone T1/T3 line links, etc. The primary processor 1 may also have direct connectivity with the secondary storage controller 6 by, for example, multiple Enterprise Systems Connection (ESCON) links 9. As a result, the I/O ERP 2 can communicate, if required, with the secondary storage controller 6. The primary storage controller 3 communicates with the secondary storage controller 6 via multiple peer-to-peer links 8, for example, multiple ESCON links.

When a write I/O operation is executed by an application program running in the primary processor 1, a hardware status channel end/device end (CE/DE) is provided indicating the I/O operation completed successfully. Primary processor 1 operating system software marks the application write I/O successful upon successful completion of the I/O operation, thus permitting the application program to continue to a next write I/O operation which may be dependent upon the first or previous write I/O operation having successfully completed. On the other hand, if the write I/O operation was unsuccessful, the I/O status of channel end/device end/unit check (hereinafter referred to as CE/DE/UC) is presented to the primary processor 1 operating system software. Having presented unit check, the I/O ERP 2 takes control obtaining specific sense information from the primary storage controller 3 regarding the nature of the failed write I/O operation. If a unique error to a volume occurs then a unique status related to that error is provided to the I/O ERP 2. The I/O ERP 2 can thereafter perform new peer-to-peer synchronization error recovery for maintaining data integrity between the primary storage controller 3 and the secondary storage controller 6, or in the worst case, between the primary processor 1 and the secondary processor 5.

Figure 2:
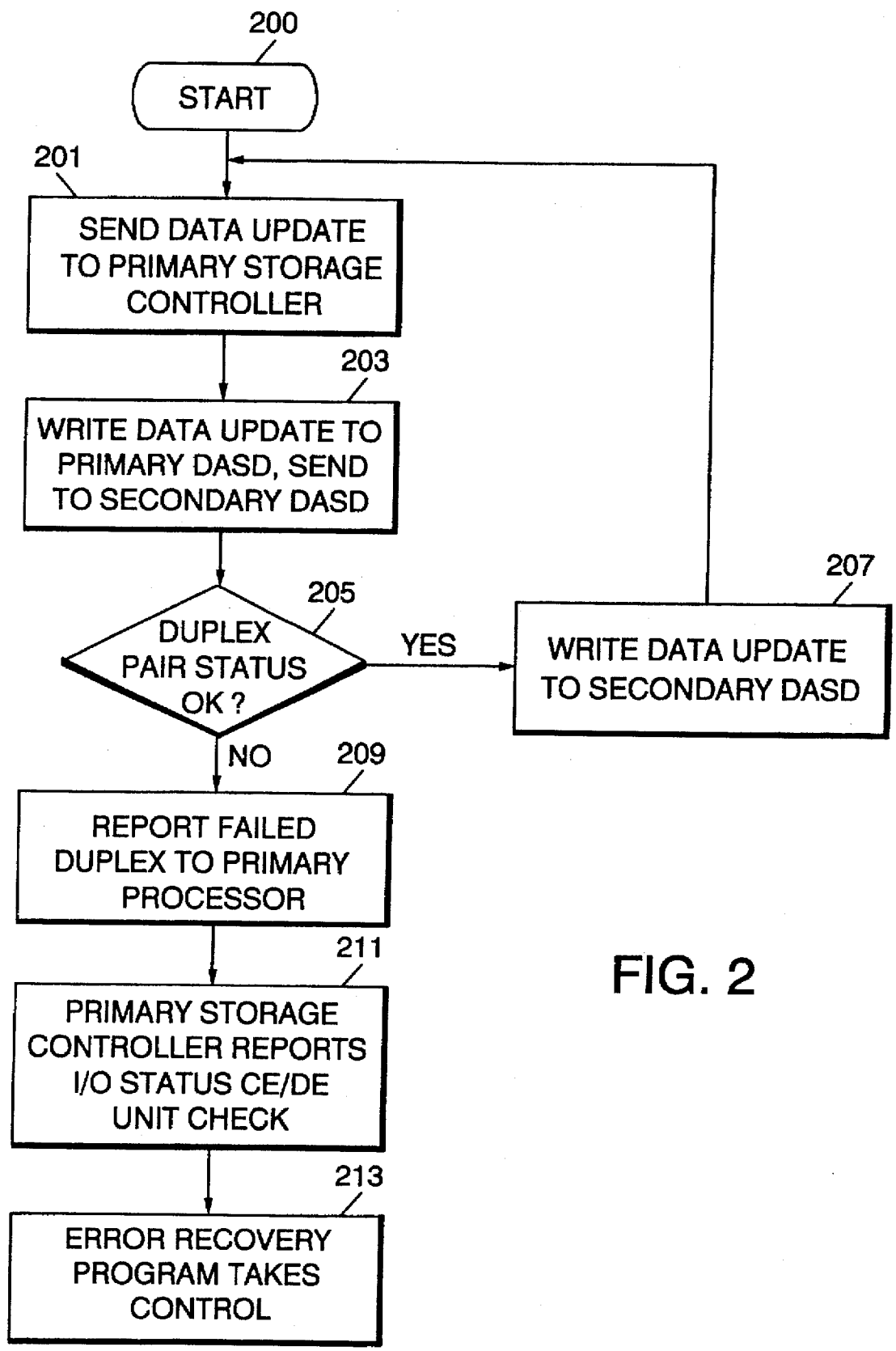
FIG. 2 is a flow diagram of a method for providing synchronous remote copy according to the disaster recovery system of FIG. 1.

Referring to FIG. 2 the error recovery procedure is set forth. In FIG. 2, a step 201 includes an application program running in the primary processor 1 sending a data update to the primary storage controller 3. At step 203 the data update is written to the primary DASD 4, and the data update is shadowed to the secondary storage controller 6. At step 205 the duplex pair status is checked to determine whether the primary and secondary sites are synchronized. If the duplex pair status is in a synchronized state, then the data update is written to the secondary DASD 7 at step 207 while processing continues at the primary processor 1 via application programs running thereat.

In the case that the duplex pair is in a "failed" state, then at step 209 the primary storage controller 3 notifies the primary processor 1 that duplex pair has suspended or failed. The duplex pair can become "failed" due to communication failure between the primary storage controller 3 and the secondary storage controller 6 via communication links 8. Alternatively, duplex pair can become "failed" due to errors in either the primary or secondary subsystem. If the failure is in the communication links 8, then the primary storage controller 3 is unable to communicate the failure directly to the secondary storage controller 6. At step 211 the primary storage controller 3 returns I/O status CE/DE/UC to the primary processor 1. The I/O ERP 2 quiesces the application programs hence taking control of the primary processor 1 at step 213 for error recovery and data integrity before returning control to the application requesting the write I/O operation.

ASYNCHRONOUS DATA SHADOWING

Asynchronous remote data shadowing is used when it is necessary to further increase a distance between primary and secondary sites for reducing the probability that a single disaster will corrupt both primary and secondary sites, or when primary application performance impact needs to be minimized. While the distance between primary and secondary sites can now stretch across the earth or beyond, the synchronization of write updates across multiple DASD volumes behind multiple primary subsystems to multiple secondary subsystems is substantially more complicated. Record write updates can be shipped from a primary storage controller via a primary data mover to a secondary data mover for shadowing on a secondary storage subsystem, but the amount of control data passed therebetween must be minimized while still being able to re-construct an exact order of the record write updates on the secondary system across several storage controllers as occurred on the primary system across multiple DASD volumes behind several storage controllers.

Figure 3:
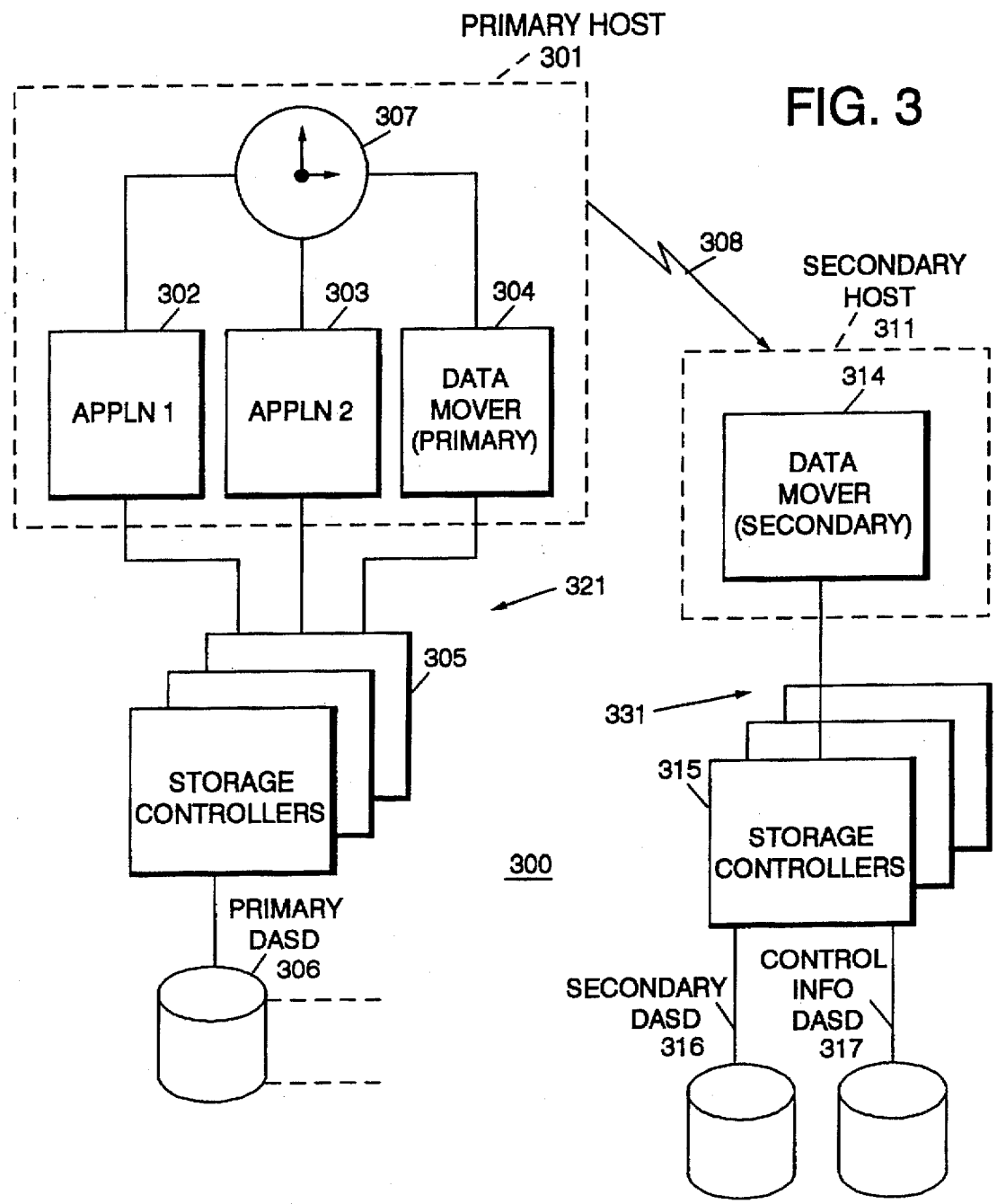
FIG. 3 is a block diagram of a disaster recovery system having asynchronous remote data shadowing capabilities.

FIG. 3 depicts an asynchronous disaster recovery system 300 including a primary site 321 and a remote or secondary site 331. The primary site 321 includes a primary processor 301, for example, an IBM ES/9000 running DFSMS/MVS host software. The primary processor 301 further includes application programs 302 and 303, for example, IMS and DB2 applications, and a primary data mover (PDM) 304. A common sysplex clock 307 is included in the primary processor 301 for providing a common reference to all applications (302, 303) running therein, wherein all system clocks or time sources (not shown) synchronize to the sysplex clock 307 ensuring all time dependent processes are properly timed relative to one another. The PDM 304, though shown connected to the sysplex timer 307, is not required to synchronize to the sysplex timer 307 since write I/O operations are not generated therein. A sysplex timer 307 is not required if the primary processor 301 has a single time reference (for example, a single multi-processor ES/9000 system).

A plurality of primary storage controllers 305, for example, IBM 3990 Model 6 storage controllers, are connected to the primary processor 301 via a plurality of channels, for example, fiber optic channels. Connected to each primary storage controller 305 is at least one string of primary DASDs 306, for example, IBM 3390 DASDs. The primary storage controllers 305 and the primary DASDs 306 form a primary storage subsystem. Each storage controller 305 and primary DASD 306 need not be separate units, but may be combined into a single drawer.

The secondary site 331, located for example, some thousands of kilo-meters remote from the primary site 321, similar to the primary site 321, includes a secondary processor 311 having a secondary data mover (SDM) 314 operating therein. Alternatively, the primary and secondary sites can be the same location, and further, the primary and secondary data movers can reside on a single host processor (secondary DASDs may be just over a fire-wall). A plurality of secondary storage controllers 315 are connected to the secondary processor 311 via channels, for example, fiber optic channels, as is known in the art. Connected to the storage controllers 315 are a plurality of secondary DASDs 316 and a control information DASD(s) 317. The storage controllers 315 and DASDs 316 and 317 comprise a secondary storage subsystem.

The primary site 321 communicates with the secondary site 331 via a communication link 308. More specifically, the primary processor 301 transfers data and control information to the secondary processor 311 by a communications protocol, for example, a virtual telecommunications access method (VTAM) communication link 308. The communication link 308 can be realized by several suitable communication methods, including telephone (T1, T3 lines), radio, radio/telephone, microwave, satellite, etc.

The asynchronous data shadowing system 300 encompasses collecting control data from the primary storage controllers 305 so that an order of all data writes to the primary DASDs 306 is preserved and applied to the secondary DASDs 316 (preserving the data write order across all primary storage subsystems). The data and control information transmitted to the secondary site 331, must be sufficient such that the presence of the primary site 321 is no longer required to preserve data integrity. The applications 302, 303 generate data or record updates, which record updates are collected by the primary storage controllers 305 and read by the PDM 304. The primary storage controllers 305 each grouped its respective record updates for an asynchronous remote data shadowing session and provides those record updates to the PDM 304 via non-specific primary DASD 306 READ requests. Transferring record updates from the primary storage controllers 305 to the PDM 304 is controlled and optimized by the PDM 304 for minimizing a number of START I/O operations and time delay between each read, yet maximizing an amount of data transferred between each primary storage controller 305 and the primary processor 301. The PDM 304 can vary a time interval between non-specific READs to control this primary storage controller-host optimization as well as a currency of the record updates for the secondary DASDs 316.

Collecting record updates by the PDM 304, and transmitting those record updates to the SDM 314, while maintaining data integrity, requires the record updates to be transmitted for specific time intervals and in appropriate multiple time intervals with enough control data to reconstruct the primary DASDs 306 record WRITE sequence across all primary storage subsystems to the secondary DASDs 316. Re-constructing the primary DASDs 306 record WRITE sequences is accomplished by passing self describing records from the PDM 304 to the SDM 314. The SDM 314 inspects the self describing records for determining whether any records for a given time interval have been lost or are incomplete.

After all read record sets across all primary storage controllers 305 for a predetermined time interval are received at the secondary site 331, the SDM 314 interprets the received control information and applies the received read record sets to the secondary DASDs 316 in groups of record updates such that the record updates are applied in the same sequence that those record updates were originally written on the primary DASDs 306. Thus, all primary application order (data integrity) consistency is maintained at the secondary site 331. This process is hereinafter referred to as forming consistency groups. Forming consistency groups is based on the following assumptions: (A) application writes that are independent can be performed in any order if they do not violate controller sequence order; (B) application writes that are dependent must be performed in timestamp order, hence an application cannot perform a dependent write number two before receiving control unit end, device end from write number one; and (C) a second write will always be either (1) in a same record set consistency group as a first write with a later timestamp or (2) in a subsequent record set consistency group.

Figure 4:
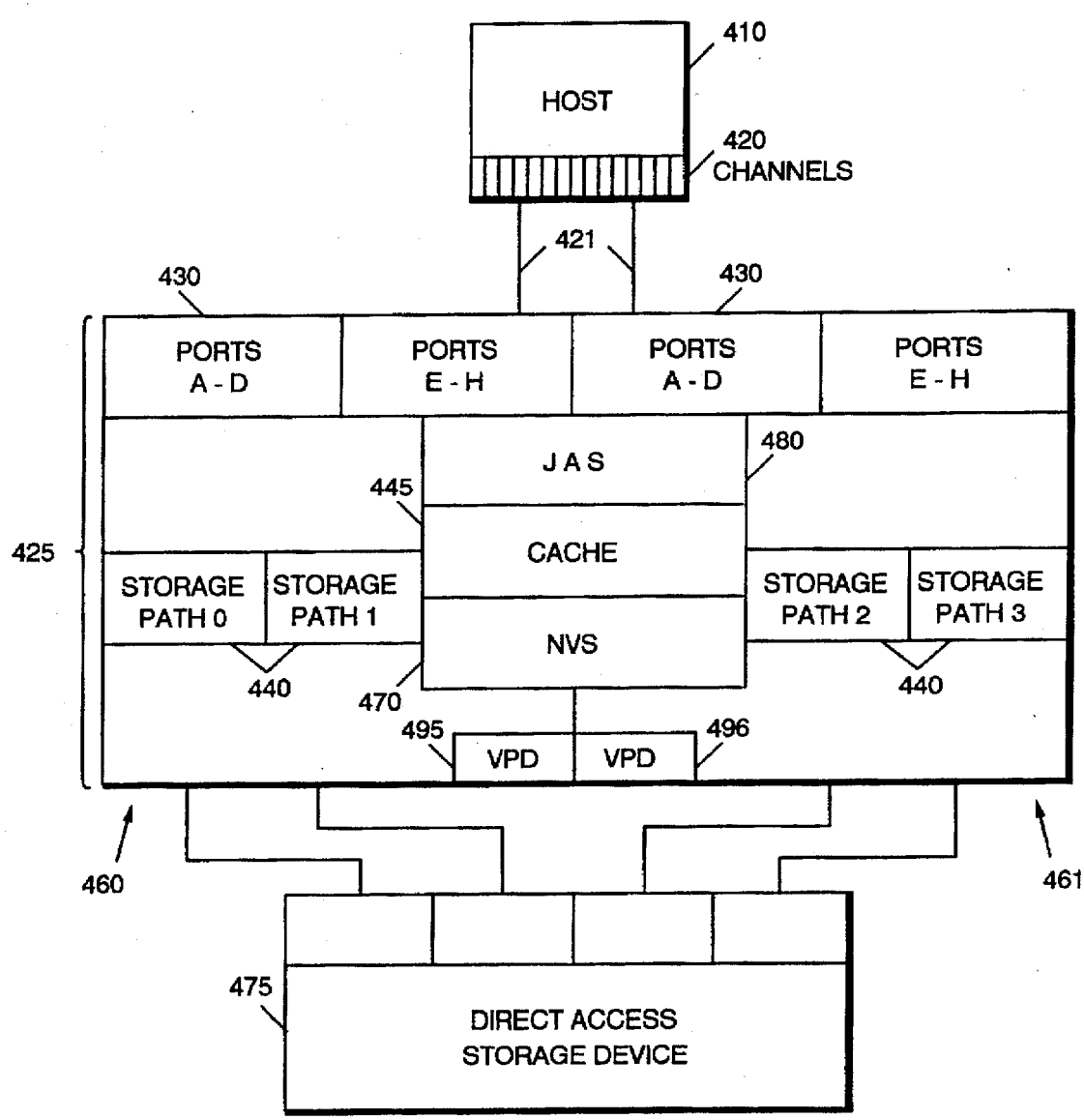
FIG. 4 is a block diagram showing a storage controller in greater detail as connected in data storage system.

Referring to FIG. 4, a storage controller 425, for example an IBM 3990 storage controller, is shown in greater detail as connected to a data processing system including a host processor 410, such as an IBM System/370 or IBM Enterprise Systems/9000 (ES/9000) processor running, for example, data facility storage management subsystem/multiple virtual systems (DFSMS/MVS) software. The storage controller 425 is further connected to a direct access storage device (DASD) 475, such as an IBM 3380 or 3390 DASD. A storage subsystem is formed by the storage controller 425 and DASD 475. The storage subsystem is connected to the host processor 410 via communication links 421, wherein the communication links 421 connect to channels 420 of the host processor 410 and to ports A–D, E–H 430 of the storage controller 425. The communication links 421 can be either parallel or serial links, for example, enterprise system connections (ESCON) serial fiber optic links.

The storage controller 425 includes dual clusters 460 and 461, the dual clusters 460, 461 having separate power supplies (not shown) and further including ports A–D, E–H 430 for providing a communication interface thereto. Both non-volatile storage 470 and cache 445 are provided for temporary data storage and is accessible to both clusters 460, 461. Storage paths 0–3 440 provide necessary paths to the DASD 475. Vital product data is maintained in VPDs 495 and 496. A storage controller, similar to the storage controller 425 is described in U.S. Pat. No. 5,051,887, assigned to the assignee of the present invention, and is hereby incorporated by reference.

Figure 5:
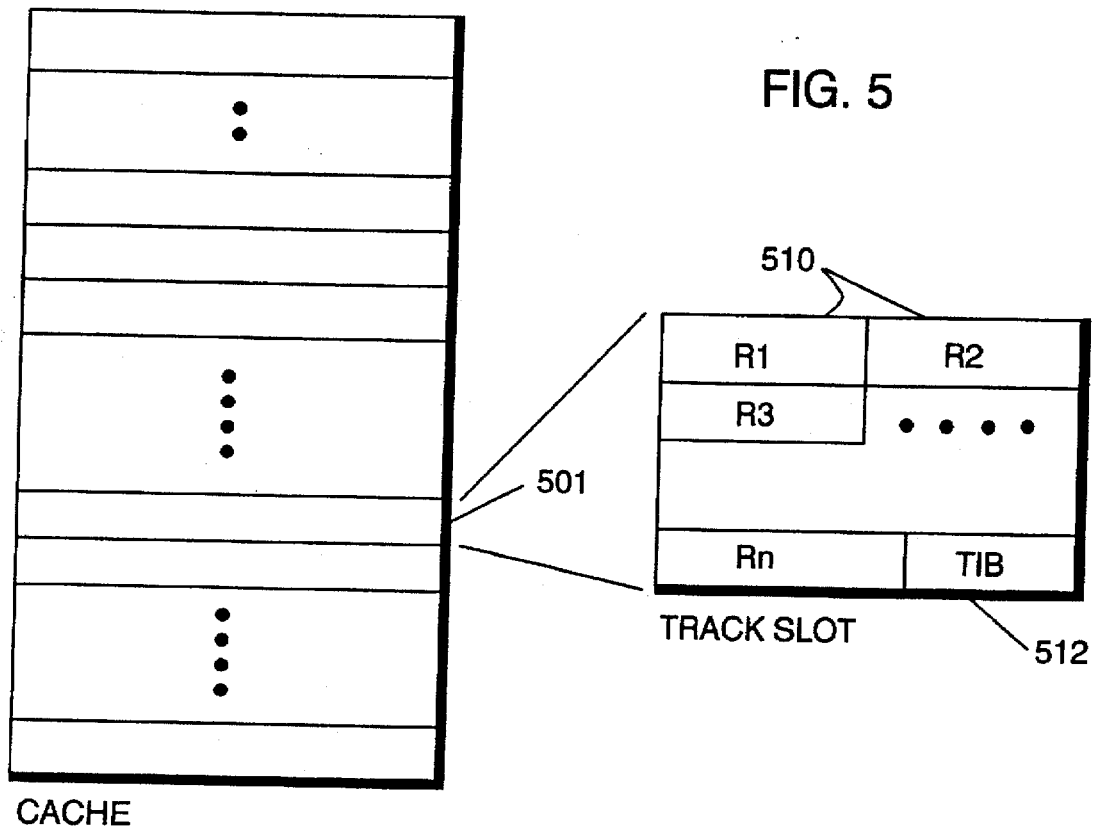
FIG. 5 is a data format diagram showing a track slot for storing records in a cache memory.

FIG. 5 shows a track slot 501 in the cache memory of the storage controller. A track slot holds the equivalent of an entire track of data. In a data processing system, data received from the host processor in the storage controller is ultimately stored on a DASD. Data stored on a DASD is physically arranged in tracks on the device. One or more records make up this track of data. The cache memory is partitioned into sections equal in length to the amount of data which can be stored in a track on the device. These sections are called track slots. Each track slot consists of one or more data records 510, and a Track Information Block (TIB) 512.

Because the cache memory can hold only a small fraction of the data that can be stored on one DASD, there is not a track slot in cache for every physical track on the device. Tracks of data from a storage device are selectively stored in cache. Also, one storage controller with its cache memory is connected to many storage devices. The cache memory contains selected tracks of data from an array of DASD. System performance and data access efficiency is improved by storing the most frequently accessed tracks in the cache memory. Thus, the track slot 501 needs to contain information in it indicating the particular device and the specific track on the device to which the data records in the track slot belong. The Track Slot Header performs part of this function. The TIB 512 contains pointers to records stored in the track slot 501, pointers to updated records stored in the non-volatile storage (NVS), and flags denoting which records have been updated.

Figure 6:
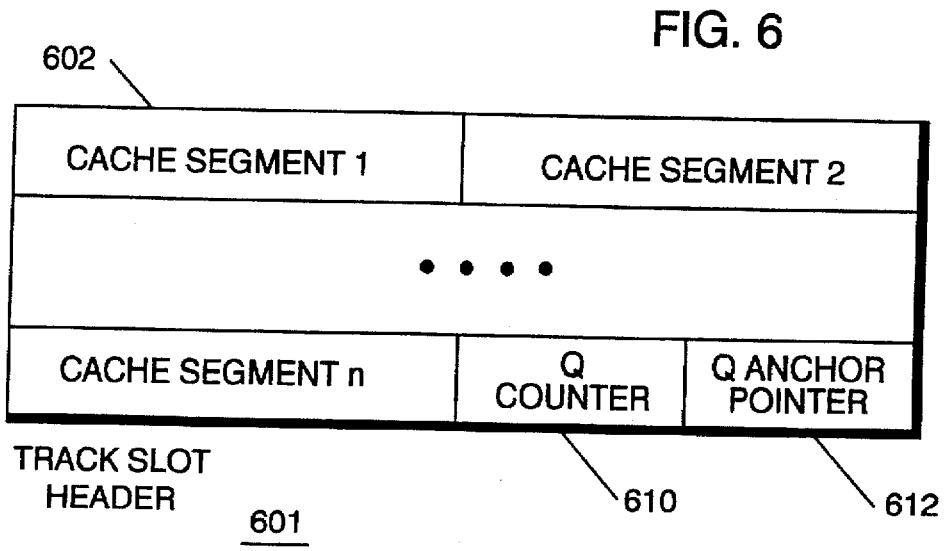
FIG. 6 is a data format diagram showing a track slot header in the cache memory.

The track slot header 601 is shown in FIG. 6. The track slot header is used to store the physical device address of the records stored in the associated track slot 501. The physical device address specifies the particular DASD and the specific track on the DASD corresponding to the records located in the track slot 501. The track slot header 601 also contains the location in cache of a specific track of data for a particular data storage device. The cache location of the track of data, and the data records comprising the track, is listed by cache segments 602 in the track slot header. A cache segment 602 is a contiguous section of cache memory. Each track of data occupies multiple segments of cache. A track of data is not necessarily stored in cache segments that are addressed in consecutive order.

The track slot header 601 also contains a Remote Copy Queue counter 610 and a Remote Copy Queue Anchor pointer 612. The queue counter 610 counts the number of record sets in a particular data storage device track that were updated only once before the data mover requested the records to be remotely copied to the secondary site. A record set consists of one or more records updated during the same command chain from the application in the host processor to the storage controller. The queue counter 610 also reflects the number of updated record sets that have not been sent to the data mover in the host processor for transfer from the primary system to the secondary system for data backup purposes. If a record in a previously updated record set is subsequently updated again in a new command chain from the host processor and the previous update to the record has not been transferred to the data mover in the host processor, the queue counter 610 in a new track slot header 601 indicates the previous updates. The queue counter 610 in the current track slot header 601 is set to one for indicating this subsequent update.

The queue anchor pointer 612 in the track slot header 601 points to the entry 702 in the Remote Copy Queue 701 (see FIG. 7) for the most recent record set updated in the track of data referenced in the command chain from the host processor to the storage controller.

Figure 7:
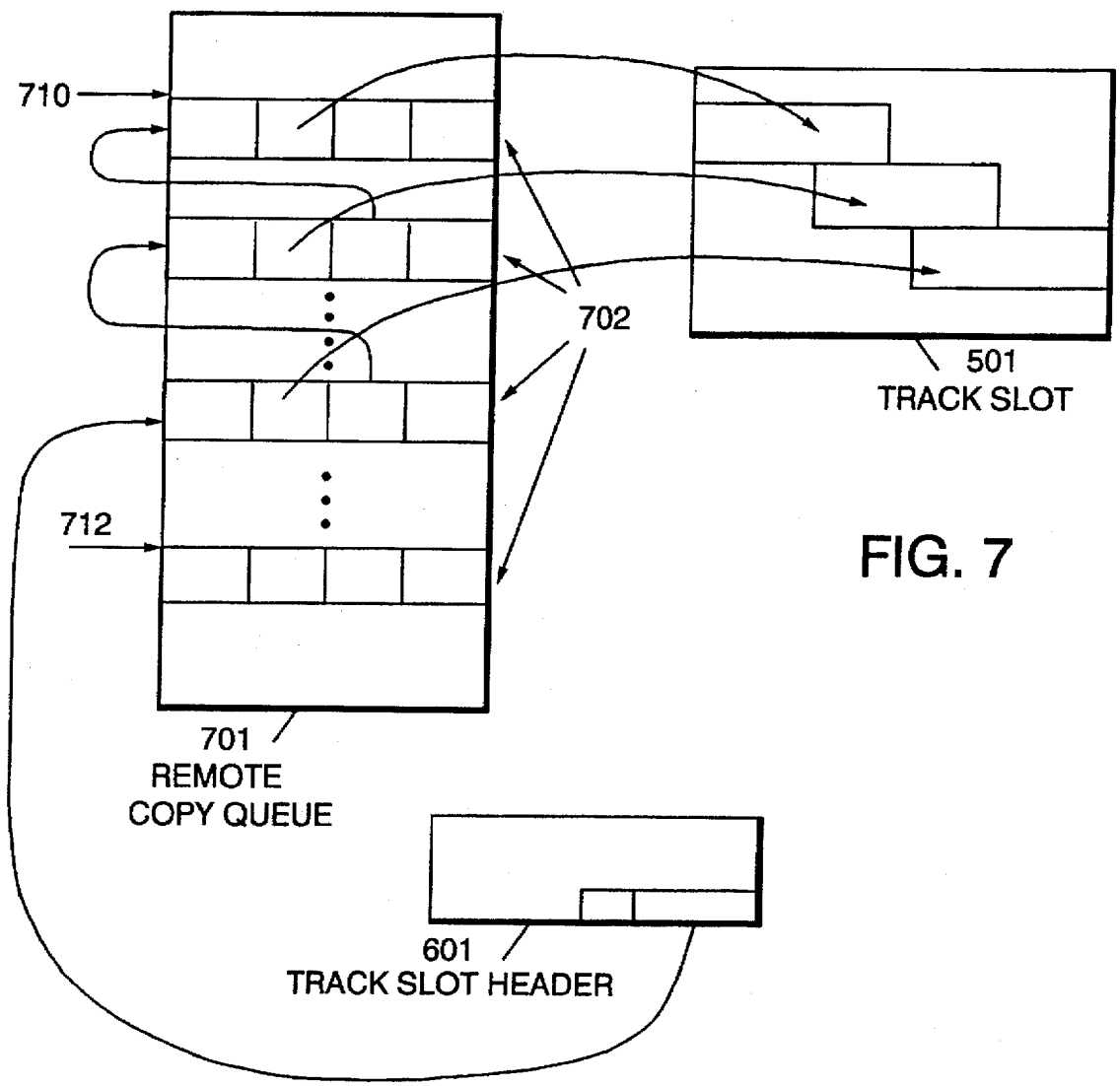
FIG. 7 is a data format diagram showing a Remote Copy Queue, a circular queue in the cache memory, and its relationship to the track slot and the track slot header.

The Remote Copy Queue is shown in FIG. 7. FIG. 7 also shows the relation between the Remote Copy Queue 701 and the track slot 501 and the track slot header 601. The track slot 501 and the track slot header 601 are included in the figure to show the relationship between the data structures and are depicted in less detail. The Remote Copy Queue 701 is a circular queue in cache with a head pointer 710 for keeping track of the oldest entry and a tail pointer 712 for tracking the most recent entry. An entry 702 is added to the queue for each updated record set written from the host processor that also needs to be copied to the secondary site. A newly added entry is placed in the circular queue 701 at the location pointed to by the queue tail pointer 712. The head pointer 710 points to the next entry to be uploaded to the data mover in the host processor. Each queue entry 702 in the Remote Copy Queue 701 references an updated record set that eventually needs to be uploaded to the data mover in the host processor. The data mover sends the updated record sets to the secondary site for backup purposes. The queue entry 702 does not contain the updated record set but instead points to the location in cache or NVS where the updated record set resides.

Figure 8:
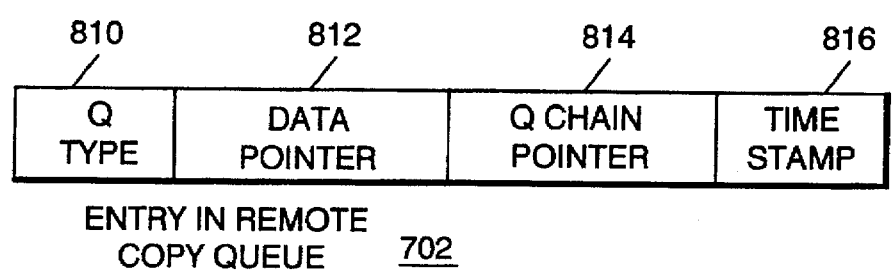
FIG. 8 is a data format diagram showing an entry to the Remote Copy Queue, the entry corresponding to an updated record set.

FIG. 8 shows a more detailed view of the queue entry 702 in the Remote Copy Queue 701. Each queue entry 702 consists of data structures for the Queue Type 810, the Data Pointer 812, the Queue Chain Pointer 814, and the Time Stamp 816. The queue type 810 classifies the record set referenced by the queue entry 702. As an example, the queue type 810 indicates if the queue entry 702 references the most recent update to a particular record set or a previous update to the record set which has not yet been sent from the controller to the data mover in the host processor. The data pointer 812 contains an address to the record set in either the cache memory or the NVS of the storage controller.

The Queue Chain Pointer 814 contains an address to another queue entry 702 in the Remote Copy Queue 701. The queue entry 702 referenced in the queue chain pointer 814 represents an updated record set located on the same track as the data record referenced by the data pointer 812 in the current entry 702. Thus, when the host processor updates several data records on the same track of data in one command chain, a single queue entry 702 in the circular queue 701 is created for the updated records. But, when a second record set is updated by the host processor which consists of different records than those previously updated, a new queue entry 702 is added to the circular queue 701. The queue anchor pointer 612 in the track slot header 601 points to the new queue entry 702 corresponding to the most recent unique record set update. In turn, the queue chain pointer 814 in this entry 702 points to the second most recent queue entry 702. The queue chain pointers 814 of particular queue entries 702 in the circular queue 701 combined with the queue anchor 612 of the track slot header 601 form a reverse order chain to access all the data records updated on the same track.

Figure 9:
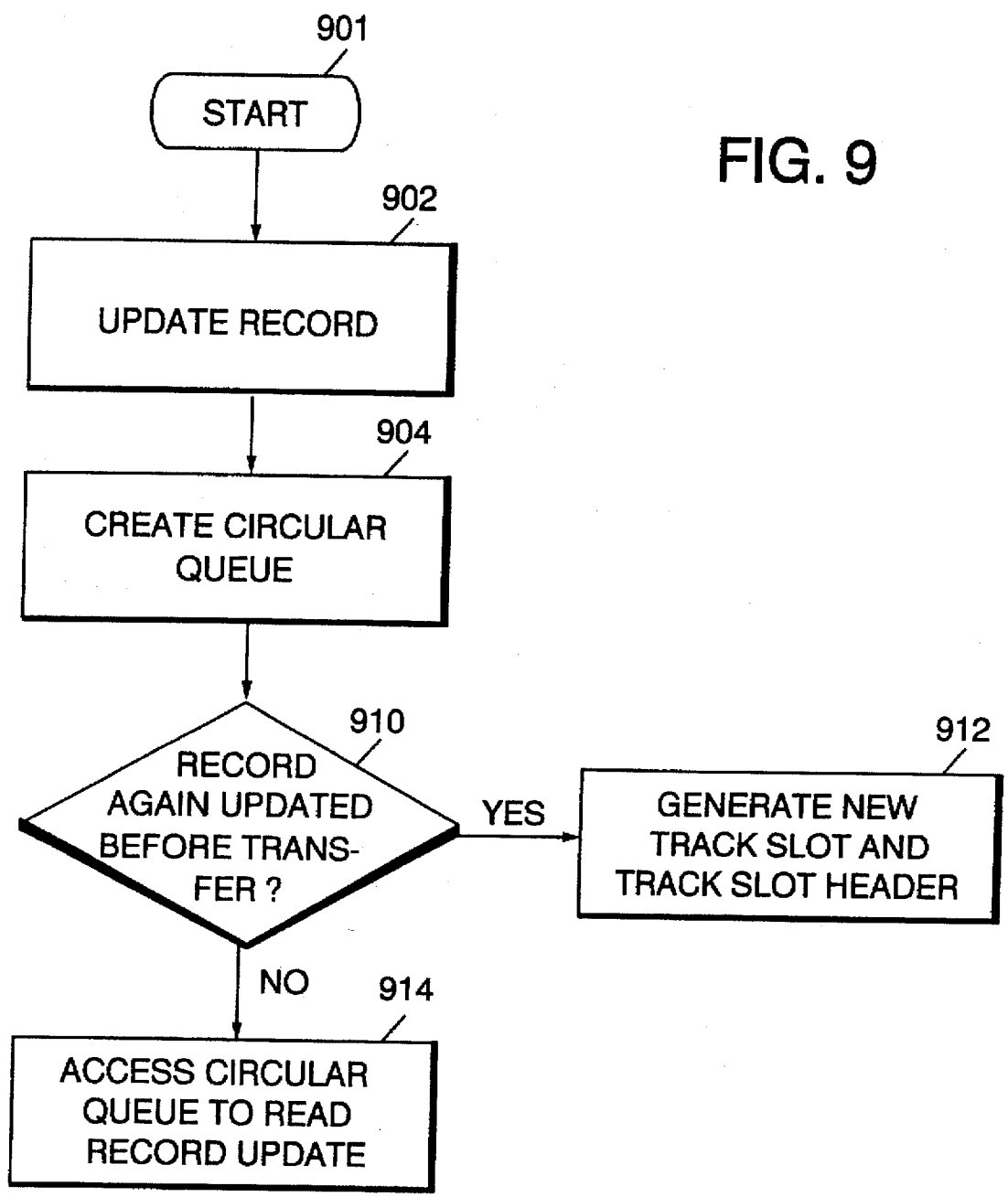
FIG. 9 is flow diagram depicting a process for linking record updates in a circular queue.

Referring to FIG. 9, a flow diagram is shown describing a method of the invention at a high level. Steps 901 and 902 indicate the process is started by receiving an update to a record from the host software application. At step 904, a circular queue, entitled the Remote Copy Queue 701, is created. The circular queue has a head pointer 710 for referencing the oldest updated record set and a tail pointer 712 for referencing the most recently updated record set.

The circular queue resides in the cache memory and references updated records stored in track slots in the cache memory. The host processor transfers these updated records to the storage controller. The data mover in the host processor then reads these updated records from the storage controller in the order that the host processor updated the records to transmit the records to the secondary site of the disaster recovery system.

A determination is made at step 910 whether a record is subsequently updated by the host processor before the data mover read the first update to the record. If the record was updated a second or subsequent time, a second or subsequent track slot 501 and a second or subsequent track slot header 601 are generated at step 912. With a separate track slot allocated in cache for each subsequent update to the data record, the storage controller can reference all updates to the record in the order they were made. If the record was not subsequently updated before the data mover requested the record, the circular queue 701 is accessed using the head pointer 710 to reference the record. The data pointer 812 of the queue entry 702 accesses the location of the record within a track slot 501 in the cache memory. Once the record is located, it is transferred from the storage controller to the data mover in the host processor. The head pointer 710 is then incremented to the next queue entry 702 in the circular queue 701.

Figure 10:
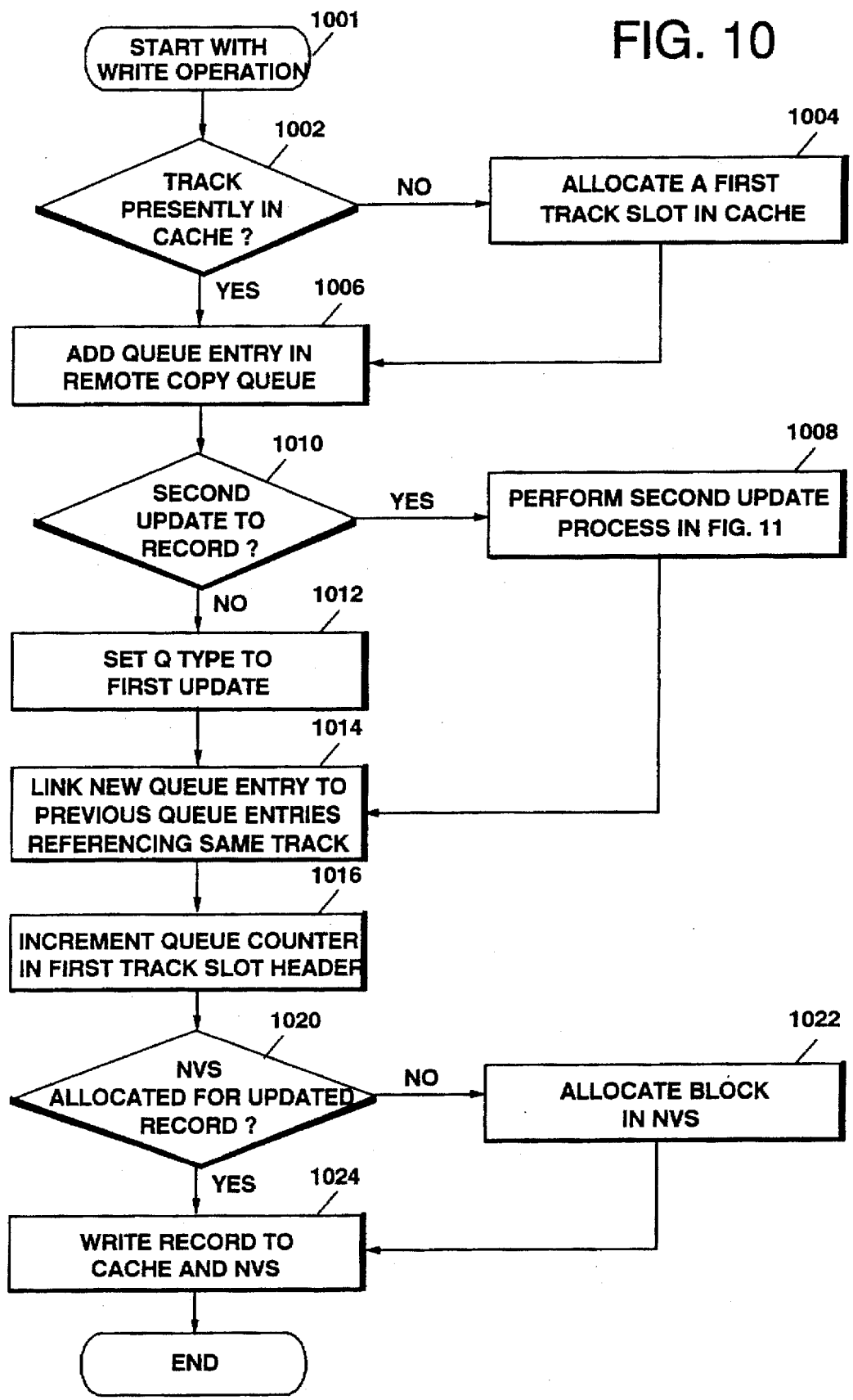
FIG. 10 is a flow diagram describing steps for storing records to be remotely copied to a secondary site.

FIG. 10 shows the steps taken by the storage controller when the host processor writes an updated version of a record to the storage controller that also needs to be remotely copied to a secondary data processing site for backup purposes.

Step 1001 denotes that the storage controller received a write command from the host processor. At step 1002, the storage controller decides whether the record to be written is a cache hit. A cache hit exists if the track of data to which the updated record belongs already resides in the cache memory of the storage controller. If the track does not reside in cache, it is a cache miss and segments 602 of the cache memory are allocated in a track slot 501 for the track of data at step 1004. An entry 702 in the Remote Copy Queue 701 is then built for the updated data record to be received from the host processor at step 1006.

At step 1010, the status of the updated record is checked. If this write operation is the first update to this record since the data mover in the host processor last requested records from the storage controller, the queue type 810 is set to indicate that it is a first update at step 1012. If this is a second or subsequent update to the data record since the Data Mover last requested data records from the controller, control is transferred to the process in FIG. 11. At step 1014, an entry 702 is added to the Remote Copy Queue 701 for the updated data record. The data pointer 812 in the queue entry 702 is loaded with the cache address of track slot header 601 corresponding to the track of data in cache containing this data record. The queue chain pointer 814 in the queue entry 702 is loaded with the queue anchor pointer 612 and is updated with an address of the queue entry in the track slot header 601. At step 1016, the queue counter 610 in the track slot header 601 is incremented to denote that a data record set within this track of data has been updated for remote copy purposes.

At step 1020, a check is made whether a block in the NVS has been allocated for the updated data record. If space in the NVS has not been previously allocated, a block is allocated in the NVS for the updated data record at step 1022. If a block in the NVS was already allocated for this data record, control continues to step 1024. At step 1024, the data record received from the host processor is written to the cache memory and to the NVS.

Figure 11:
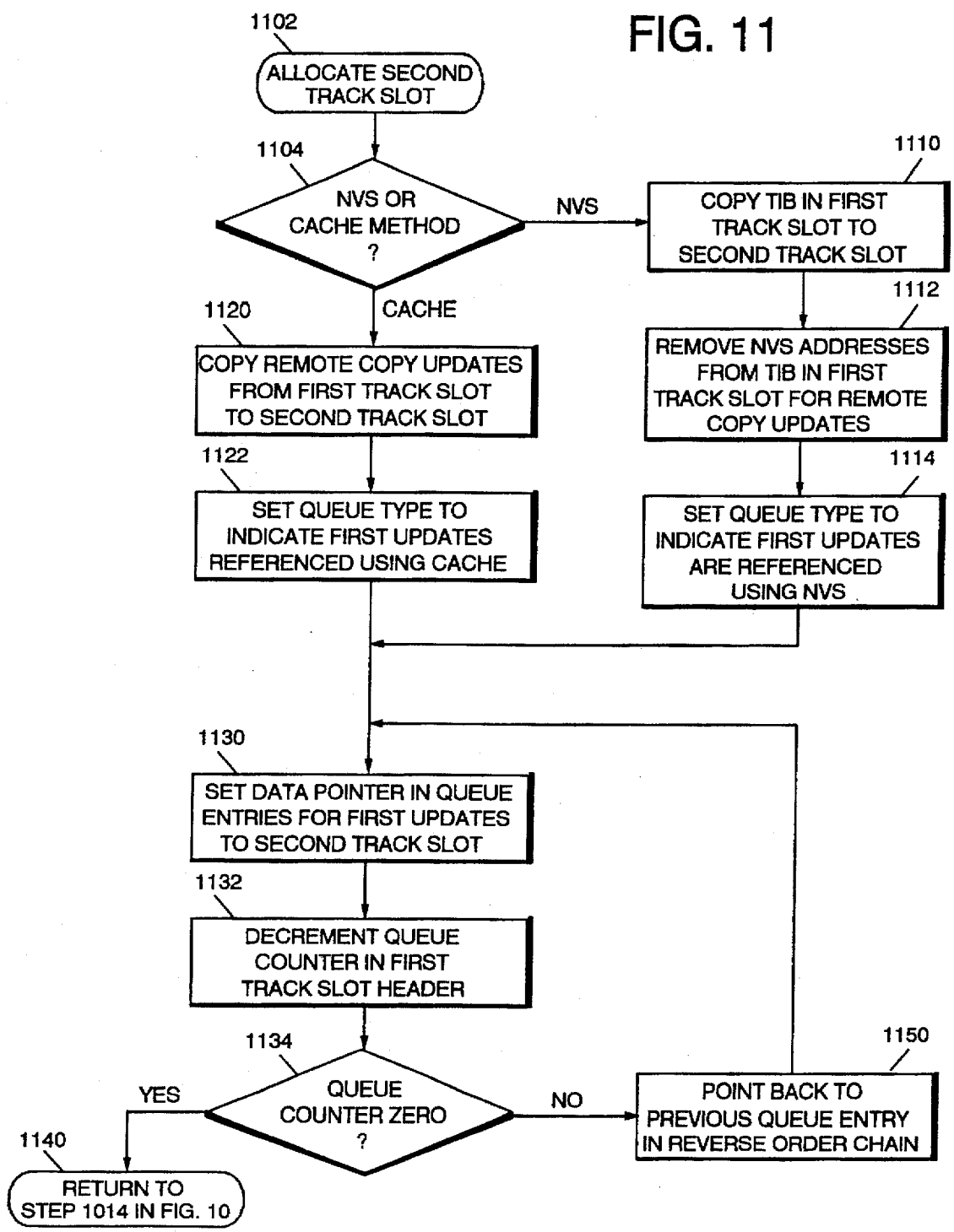
FIG. 11 is a flow diagram showing the steps taken when the host processor writes a data record to the controller that is updated a second time since the data mover last requested data records from the controller to be sent to the secondary site.

FIG. 11 outlines the steps taken in the controller when the host processor updates a data record two or more times before the Data Mover has requested data records for a transfer from the primary site to the secondary site in a disaster recovery system. At step 1102, additional cache segments 602 are allocated for a second track slot 501 in the cache memory. Also, cache space is allocated for a second track slot header 601. This second track slot 501 is used to store the updated data record and all other data records in the same track of data that have also been updated and have not yet been sent to the data mover in the host processor.

The next several steps taken depend on which form of the invention is used. Two alternate forms exist; one which utilizes the cache memory and one which utilizes the NVS. Steps 1120 and 1122 denote the use of the cache memory for storing the subsequent updates of a data record. At step 1120, updated data records in the first track slot 501 which need to be remotely copied by the data mover to the secondary site of the disaster recovery system are copied to the second track slot 501. These updated data records include the data record which has been updated a second or subsequent time and all other data records in the same track. At step 1122, the queue type 810 in the previous entry 702 to the Remote Copy Queue 701 is set to indicate that this is a second or subsequent update to the data record and the updated data record resides in cache.

Steps 1110, 1112, and 1114 denote the use of the NVS for storing the second and subsequent updates to a data record. The NVS uses a first in, first out (FIFO) method for storing records. Updated records are destaged from the NVS to the DASD in the same order in which they were stored. At step 1110, the TIB 512 in the first track slot 501 is stored in the second track slot 501. The NVS addresses in the TIB 512 for the record sets that will be modified in the first track slot 501 are then removed at step 1112. The presence of NVS addresses in the TIB represent the NVS location where an updated data record is stored. The result of steps 1110 and 1112 is that the NVS locations of those data records updated a single time are now stored in the TIB 512 in the first track slot 501 and the second track slot 501 and the NVS location of the data record to be updated a second time is removed from the TIB 512 in the first track slot 501. At step 1114, the queue type 810 in the most recent entry 702 of the Remote Copy Queue 701 is set to indicate that this data record has been updated a second or subsequent time and the updated data record resides in the NVS.

Regardless of whether the second update to the data record is referenced in the cache memory or the NVS, this queue entry 702, which corresponds to a second or subsequent update of the record, is not linked to the previous reverse order chain. The previous reverse order chain linked all the records updated a first time on the same track. Since this most recent queue entry reflects a record that has been updated a second time, a separate reverse order chain may be developed should other records on the same track be updated a second time.

At step 1130, the most recent queue entry of the reverse order chain linking the records in the same track that were updated a single time is accessed from the queue anchor pointer 612 in the second track slot header 601. The data pointer 812 of this queue entry 702 is modified to point to the location of the record in the second track slot instead of the first track slot. At step 1132, the queue counter 610 in the first track slot header 601 is decremented to indicate that the reference to an updated record has been changed from the first track slot to the second track slot. At step 1134, the decremented queue counter 610 in the first track slot 601 is checked to determine if more records remain in the reverse order chain. A queue counter of zero indicates that all the data pointers 812 in the queue entries 702 of the reverse order chain have been changed to point to the second track slot. In the case of a zero-valued queue counter, step 1140 returns control to step 1014 in FIG. 10. If the queue counter 610 is not zero, the next queue entry in the reverse order chain is accessed using the queue chain pointer 814 of the current queue entry at step 1150. Thus, steps 1130, 1132, 1134, and 1150 traverse a reverse order chain in the Remote Copy Queue 701 to change the data pointers 812 in each queue entry 702 of the chain to reference the second track slot in the cache memory.

Figure 12:
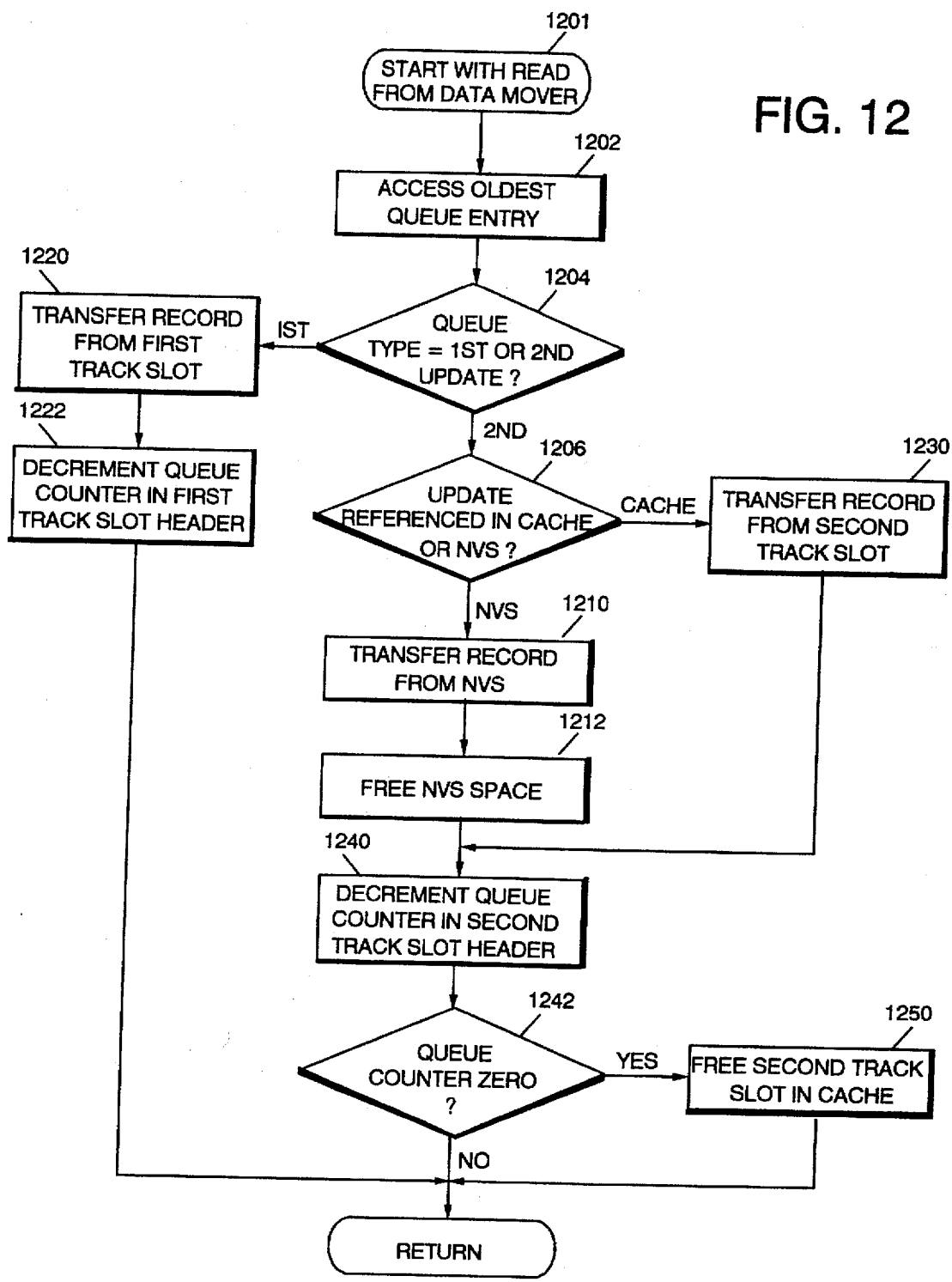
FIG. 12 is a flow diagram showing a process for sending records to the data mover in the host processor in response to a read request.

FIG. 12 shows the process for reading updated records from either the cache memory or the NVS when the data mover requests records to be remotely copied to the secondary site of a disaster recovery system. The data mover reads data records from the controller which were flagged as remote copy data when they were originally written from the host processor to the controller. Once the Data Mover receives the requested data records, it sends them to the secondary data processing system at the remote site for backup purposes. Step 1201 starts with the read request from the data mover to the storage controller. At step 1202, the oldest entry 702 of the Remote Copy Queue 701 is accessed using the head pointer 710. Step 1204 checks the queue type 810 of the queue entry 702 to determine whether this entry is for a first or second update to a record. If the queue type 810 indicates that the entry is for a first update to the record, the record is transferred to the data mover from the first track slot using the data pointer 812 at step 1220. At step 1222, the queue counter 610 in the first track slot is decremented when processing for the read request of this record is complete.

If the queue type 810 indicates that the entry is for a second update to a record, step 1206 determines from the queue type 810 whether the cache or NVS form of the invention was used to store the updates. If the cache memory was used to reference the second update, the record is transferred from the location within the second track slot where the record is stored to the data mover at step 1230. The queue counter 610 in the second track slot header is then decremented at step 1240 and checked at step 1242. If the queue counter 610 reaches zero, all the updated records within the second track slot have been transferred to the data mover. Thus, the cache memory space allocated for the second track slot 501 and the second track slot header 601 can be freed at step 1250.

If the NVS was used to reference the second update, step 1210 determines whether the record is to be transferred from the NVS or from the cache. The NVS address from the TIB 512 in the first track slot is compared to the NVS address from the TIB 512 in the second track slot. If the addresses are equal, the record exists in both the NVS and the cache memory. In this case, the record is transferred from its location within the first track slot from cache to the data mover for performance reasons. If the NVS addresses are not equal, the updated record is transferred from NVS to the data mover and the NVS space associated with the record is freed. The record is accessed in the NVS at the address designated in the TIB 512 in the second track slot. Once either transfer completes, the queue counter 610 in the second track slot header is decremented at step 1240 and checked at step 1242. Again, if the queue counter 610 reaches zero, all the updated records referenced in the TIB in the second track slot have been transferred to the data mover. Thus, the cache memory space allocated for the second track slot 501 and the second track slot header 601 can be freed at step 1250.

While the invention has been particularly shown and described with reference to preferred embodiments thereof, it will be understood by those skilled in the art that various changes in form and details may be made therein without departing from the spirit and scope of the invention. For example, the invention has been described as operating the remote copy in an asynchrounous mode, but such concepts may be extended to synchrounous type data transfers. The formats of the record updates are not dispositive, such formats could be CKD, ECKD, fixed block architecture (FBA), etc. Nor are the storage devices meant to be limited to DASD devices.

What is claimed is:

1. A storage controller in a data storage system for linking, in a backward chain using a circular queue, a plurality of record updates in a first track, said data storage system including a host processor coupled to said storage controller and running an application generating the plurality of record updates, and a direct access storage device (DASD) coupled to said storage controller for storing said plurality of record updates, said storage controller comprising:

a storage path for directing record updates between said DASD and said host processor; and a cache memory coupled to said storage path for storing a first track slot, said first track slot storing a first track including the plurality of record updates, said cache memory further storing a first track slot header corresponding to said first track slot and having a Q counter for counting a number of records updated in said first track slot and having a Q anchor pointer for referencing an entry in the circular queue, wherein the circular queue contains one entry for each record update of said plurality of record updates, each entry including a Q Type field, a data pointer, and a Q Chain pointer, each entry further linked to form the backward chain and to maintain an order consistent with a sequence in which the record updates are made.

2. The storage controller according to claim 1 wherein each circular queue entry further includes a Time Stamp.

3. The storage controller according to claim 2 further comprising a non-volatile storage coupled to said storage path.

4. The storage controller according to claim 3 wherein said cache memory further includes a second track slot header and a second track slot for storing updates to one or more record updates of said plurality of record updates.

5. A data storage system comprising:

a host processor running an application therein generating a plurality of record updates;

a channel coupled to said host processor;

a direct access storage device (DASD) for storing said plurality of record updates;

a storage controller coupled between said channel and said DASD, said storage controller comprising:

a port coupled to said channel;

a storage path coupled between said port and said DASD, said storage path directing movement of said plurality of record updates between said host processor and said DASD; and a cache memory coupled to said storage path for storing a first track slot, said first track slot storing a first track including the plurality of record updates, said cache memory further storing a first track slot header corresponding to said first track slot and having a Q counter for counting a number of records updated in said first track slot and having a Q anchor pointer for referencing an entry in a circular queue, wherein the circular queue contains one entry for each record update of said plurality of record updates, each entry including a Q Type field, a data pointer, and a Q Chain pointer, each entry further linked to form the backward chain and to maintain an order consistent with a sequence in which the record updates are made.

6. The data storage system according to claim 5 wherein each circular queue entry further includes a Time Stamp.

7. The data storage system according to claim 6 wherein said storage controller further comprises a non-volatile storage (NVS) memory.

8. The data storage system according to claim 6 wherein said host processor further comprises a data mover for reading said plurality of record updates from said storage controller for transmission to a site remote from said host processor for disaster recovery purposes.

9. The data storage system according to claim 8 further comprising:

a remote host processor for receiving said plurality of record updates from said data mover;

a remote storage controller coupled to said remote host processor; and a remote DASD coupled to said remote storage controller for storing said plurality of record updates thereon for back-up purposes.

10. The data storage system according to claim 6 wherein said cache memory further includes a second track slot header and a second track slot for storing updates to one or more record updates of said plurality of record updates.

11. The data storage system according to claim 6 further comprising a plurality of other DASDs coupled to said storage controller for storing other record updates.

* * * * *